United States Patent [19]

Belart et al.

[11] Patent Number: 4,720,151

[45] Date of Patent: Jan. 19, 1988

[54] SLIP-CONTROLLED BRAKE SYSTEM FOR AUTOMOTIVE VEHICLES

[75] Inventors: Juan Belart, Walldorf; Wolfram Seibert, Pfungstadt; Norbert Ocvirk, Offenbach, all of Fed. Rep. of Germany

[73] Assignee: Alfred Teves GmbH, Frankfurt am Main, Fed. Rep. of Germany

[21] Appl. No.: 888,998

[22] Filed: Jul. 24, 1986

[30] Foreign Application Priority Data

Aug. 20, 1985 [DE] Fed. Rep. of Germany ....... 3529744

[51] Int. Cl.$^4$ .......................... B60T 8/32; B60T 13/00; B60T 15/46
[52] U.S. Cl. .................... 303/6 A; 188/345; 303/68; 303/111; 303/114; 303/119; 303/92; 303/84 A
[58] Field of Search ................. 303/113–119, 303/68–69, 61–63, 92, 6 R, 6 C, 28, 40, DIG. 3, DIG. 4, 7, 13, 15, 14, 10–12, 84 R, 84 A, 111, 96, 22, 100; 188/345, 181, 151 A, 349, 195

[56] References Cited

U.S. PATENT DOCUMENTS

| | | | |
|---|---|---|---|
| 3,804,468 | 4/1974 | Ishikawa et al. | 188/349 X |
| 4,229,049 | 10/1980 | Ando | 303/92 X |
| 4,322,114 | 3/1982 | Maehara | 303/84 A X |
| 4,374,421 | 2/1983 | Leiber | 303/96 X |
| 4,421,362 | 12/1983 | Shirai et al. | 303/92 X |
| 4,440,454 | 4/1984 | Belart et al. | 303/119 X |
| 4,482,190 | 11/1984 | Burgdorf et al. | 303/119 X |
| 4,523,791 | 6/1985 | Belart et al. | 303/100 X |
| 4,611,858 | 9/1986 | Belart | 303/6 R |

FOREIGN PATENT DOCUMENTS 2165601 4/1986 United Kingdom ............... 303/119

Primary Examiner—Douglas C. Butler
Attorney, Agent, or Firm—James B. Raden; Robert P. Seitter

[57] ABSTRACT

A slip-controlled brake system for automotive vehicles comprising two static brake circuits (17, 18) into which a pressure medium is introduceable from a dynamic pressure medium circuit (21, 23) during the control operation, and one dynamic brake circuit (14). Directional control valves (7, 8, 9) are interposed in the brake circuits (14, 17, 18). The directional control valves permit a reduction of the pressure in the wheel brakes and a return flow of the pressure medium to the storage reservoir (3). In addition, two pressure-controlled three-way/two-position valves (40, 40') are interposed in the rear wheel brake circuit (14) between the rear axle regulating valves (6, 9) and the wheel cylinders of the rear wheel brakes (HL, HR). The valves are actuated by the pressure in the front wheel brake circuits (17, 18). The three-way/two-position valves (40, 40') have the effect of reducing the pressure in the diagonal rear wheel break circuit in the event of a failure of one of the front wheel brake circuits due to a defect.

3 Claims, 4 Drawing Figures

4,720,151

SLIP-CONTROLLED BRAKE SYSTEM FOR AUTOMOTIVE VEHICLES

BACKGROUND OF THE INVENTION

The present invention relates to a slip-controlled system for automotice vehicle, which brake system comprises at least one static brake circuit into which a pressure medium is introduced from a controlled pressure medium circuit during a controlled braking operation. The system further comprises a brake pressure generator provided with a master cylinder arrangement, and with directional control valves which are interposed in the brake circuits and permits a reduction of the pressure in the wheel brakes and a return flow of the pressure medium to the storage reservoir.

Experience has shown that vehicles with a high front axle load and a comparatively low rear axle load have a tendency towards high yawing moments when a failure of a front axle brake circuit occurs and the brake pressure in the wheel cylinders of the rear wheel brakes is maintained.

It is, therefore, an object of the present invention to further improve the safety and the reliability of a slip-controlled brake system and to develop a system wherein a yawing moment occurring during a braking operation is reduced in the event of a failure of a front axle brake circuit due to a defect in the brake system.

SUMMARY OF THE INVENTION

This object is achieved in a surprisingly simple and technically advanced manner by means of a slip-controlled brake system of the type initially referred to. The improvement of such brake system comprises the provision of two pressure-controlled three-way/two-position valves interposed in the rear wheel brake circuit between the rear axle regulating valves and the wheel cylinders of the rear wheel brakes, both three-way/two-position valves being actuated by the pressure in the front wheel brake circuits.

Preferably, each three-way/two-position valve comprises two displaceable pistons which are arranged in a stepped bore provided in the valve housing, one piston which is displaceable between two stops in the smaller step of the stepped bore being provided with a valve body controlling, on the one hand, a pressure medium passage at the piston and cooperating, on the other hand. A pressure medium passage of the piston is displaceable between two stops in the larger step. The pressure medium passage connects the chamber between the two pistons with the return conduit.

Between the two pistons, which are movable against each other, a valve spring is expediently arranged. The piston located in the large step is acted upon by the pressure of the brake circuit of a front wheel brake and the piston located in the small step of the stepped bore is acted upon by the pressure of the rear wheel brake circuit. Advantageously, the chamber between the two pistons is connected with a rear wheel brake by way of a brake line.

In a preferred embodiment, the piston acted upon by the pressure of the static brake circuit is shaped in the form of a stepped piston encompassing together with the large step of the stepped bore of the valve housing an annular chamber, which is connected to the return conduit and communicates and with the chamber between the two pistons by way of a pressure medium passage in the piston. The pressure medium passage is closable by means of a valve body arranged at the piston acted upon by the pressure of the dynamic brake circuit.

BRIEF DESCRIPTION OF THE DRAWING

Other features, advantages and applications of the present invention will become apparent from the following description of an embodiment of the present invention when taken in connection with the accompanying drawing wherein.

DETAILED DESCRIPTION

Figure 1:
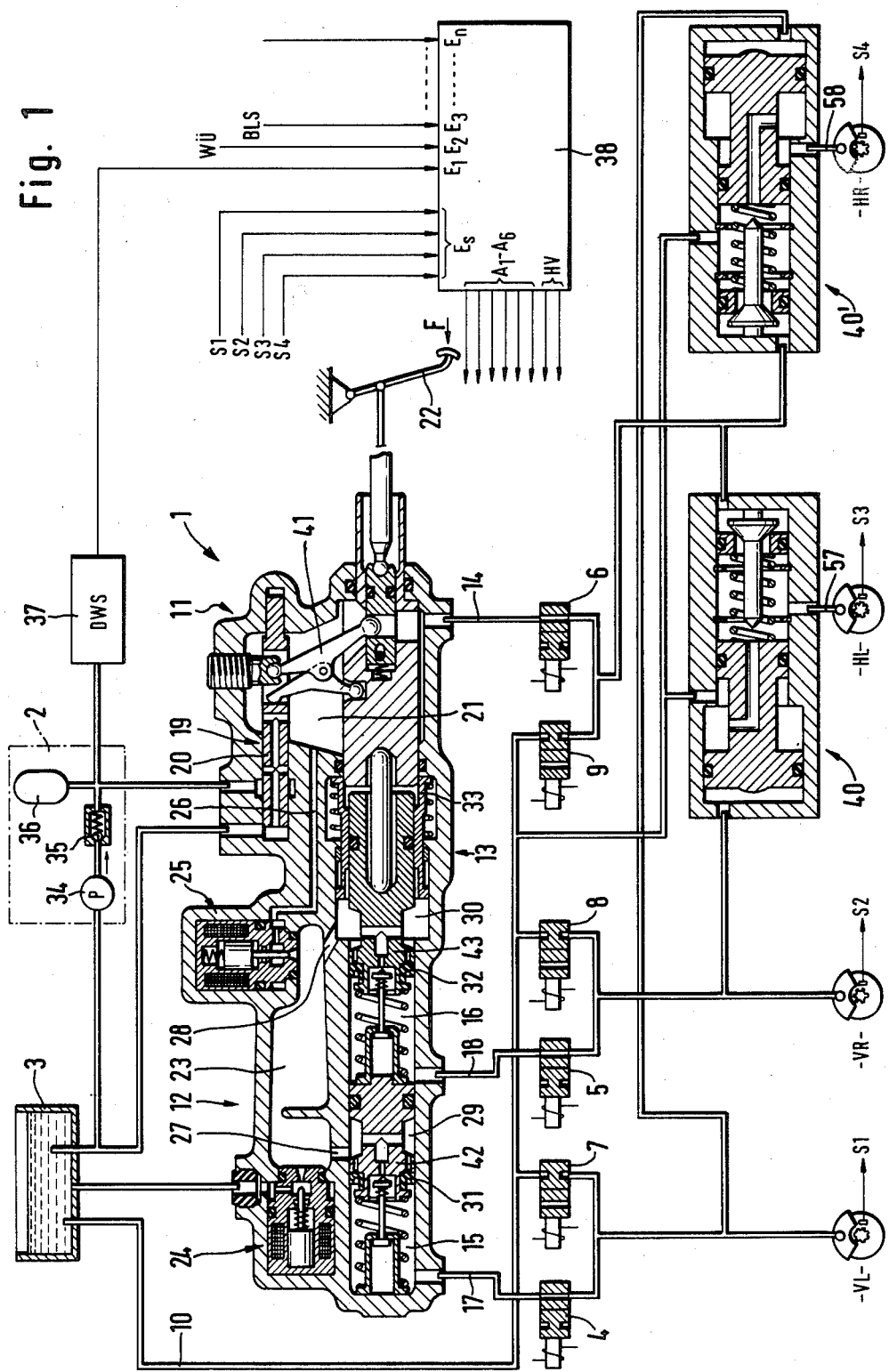
FIG. 1 shows the wiring diagram of a brake system and of the invention.

Referring to FIG. 1, the brake system according to the invention includes a pedal-actuated long-stretched hydraulic brake pressure generator which is marked in its entirety by the reference numeral 1, an auxiliary pressure source 2, a storage and pressure compensating reservoir 3 and electromagentically actuatable two-way/two-position valves 4 to 6 through the intermediary of which the wheel brakes and/or the front and rear wheels VR, VL, HR and HL are connected to three hydraulically separate brake circuits. Normally, (i.e., as long as they are not energized) the valves 4 to 6 are switched so as to be open. In addition, a return conduit 10 leading from the front and from the rear wheels VR, VL, HR, HL to the compensating reservoir 3 is provided, which return conduit is, however, separated from the wheel brake cylinders by means of three additional two-way/two position valves 7 to 9 as long as the valves 7 to 9 are not energized. The brake pressure generator 1, in turn, comprises a hydraulic brake power booster 11 and a master cylinder arrangement 12.

A brake circuit, namely the rear wheel brake circuit 14, is directly connected to the brake power booster 11, whereas each of the two working chambers 15 and 16 of the master cylinder arrangement 12 which is, in this construction, shaped in the form of a tandem master cylinder, is connected with a front wheel VR and/or VL by way of individual brake circuits 17 and 18. The two master cylinder circuits of such an arrangement are referred to as static pressure medium circuits, the rear axle circuit as controlled or dynamic pressure medium circuit since in this circuit 14 the pressure is determined by means of the position of a pedal-actuated regulating valve 19, by way of a linkage 41, which, depending on the displacement of a valve piston 20, allows for a higher or lower inflow of pressure from the auxiliary pressure source 2 into the booster chamber 21 and from there into the brake circuit 14.

The pressure which is built up in the booster chamber 21 and/or which is introduced by means of the regulating valve 19 when a braking pedal 22 is actuated simultaneously acts upon the pistons 42, 43 of the master cylinder arrangement 12 and results in a build-up of braking pressure in the working chambers 15 and 16 of the two static brake circuits 17, 18 leading to the front wheels VR and VL. At first, atmospheric pressure still prevails in a pre-chamber 23 of the master cylinder arrangement 12 because this chamber communicates in the inoperative position, in which the valve is not energized, with the pressure compensating reservoir 3 by way of a so-called main valve 24. Another main valve 25 is closed in the inoperative position.

Each wheel VL, VR, HL, HR of the vehicle equipped with the brake system according to the invention is provided with a sensor S1–S4 which is, for instance, shaped in the form of an inductive transducer and which feeds the information about the rotating behavior of the wheel into an electronic controller 38. The corresponding inlets of the controller 38 are marked with $E_S$. This controller comprises, among other things, an electronic logical operation circuit in the form of wired or programmable switching circuits such as microprocessors and generates, after the evaluation of the sensor signals, control commands which are available at the outlets $A_1$–$A_6$ and HV and which are further transmitted to the respective solenoid valves 4 to 9, 24 and 25 by way of signalling lines (not shown).

When the brake slip control sets in, both main valves 24 and 25 are swtiched over. Thereby, a pressure medium path 26 leading from the booster chamber 21 to the pre-chamber 23 is released, thus allowing a pressure medium to flow into the pre-chamber 23. This pressure is further transmitted by way of the connecting channels 27, 28 to the annular chambers 29, 30 within the master cylinder arrangement 12. From these chambers, the pressure is dynamically fed, through the intermediary of cup seals 31, 32 arranged at the circumference of the pistons 42, 43 and performing the function of non-return valves, into the working chambers 15, 16 which communicate with the wheel brakes of the front wheels.

The dynamically introduced pressure leads, at the same time, to a reset of a positioning sleeve 33, the pistons 42, 43 thus taking a defined position in the master cylinder arrangement 12 in a well-known manner.

Due to the dynamic introduction of a pressure medium into the static circuits of the front wheels VR, VL and into the annulr chamber 30, which introduction is of importance for the resetting pressure acting on the positioning sleeve 33, an "empty control" of the working chambers 15 and 16 is excluded even in the event of a frequent pressure reduction due to the discharge of pressure medium by way of the valves 7 and 8 which have been switched over.

In the event of a defect occurring in the auxiliary energy supply system 2 comprising, in the present construction, a pressure medium pump 35 with the associated non-return valve 35 and a pressure medium accumulator 36, the pressure warning circuit (DWS) 37 responds and transmits this information to the electronic controller 38 of the brake system and causes, depending on the amount of the residual pressure, a partial or total cut-off of the brake slip control. In the embodiment illustrated in the drawing, the pressure warning circuit 37 is necessary due to the fact that the auxiliary energy is also used for normal uncontrolled braking to boost the brake power in the static pressure circuits 17, 18 and to generate the braking pressure in the dynamic brake circuit 14.

Defects in the dynamic pressure medium path within the brake pressure generator 1 (e.g., a defect in the booster chamber 21 or in the line 26) a leaky main valve 24 or a non-opening main valve 25, can be detected by determining the position of the positioning sleeve 33.

Figure 2:
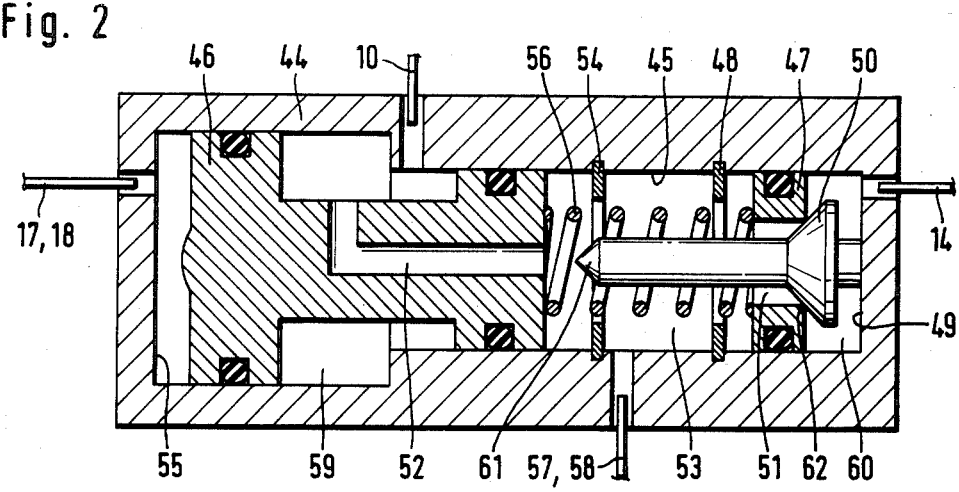
FIGS. 2, 3 and 4 show a three-way/two-position valve in three different switching positions.

Two three-way/two-position valves 40, 40' are arranged downstream of the two-way/two-position valve 6 of the dynamic brake circuit 14 (FIG. 2). One three-way/two-position valve 40 is connected with the rear wheel brake HL by way of a brake line 57 and the other three-way/two-position valve 40' is connected with the rear wheel brake HR by way of a brake line 58. Both three-way/two-position valves 40, 40' have the same design and comprise two pistons 46, 47 each of which is longitudinally displaceably arranged in the stepped bore 45 of the valve housing 44. The two pistons 46, 47 are displaceable against each other in opposition to the force of a valve spring 56 between the stops 48, 49 and/or 54, 55 respectively. One piston 47 arranged in the small step of the stepped bore 45 is provided with a pressure medium passage 51 connecting the chamber 60 behind the piston 47 with the chamber 53 between the two pistons 46, 47. The pressure medium passage 51 is closable by means of a valve body 50 which cooperates at the same time with another valve passage 52 provided in the piston 46 arranged in the large step of the stepped bore 45. This pressure medium passage 52 provided in the piston 46 connects the chamber 53 between the two pistons 46, 47 with an annular chamber 59 which is formed by the piston 46 together with the large step of the stepped bore 45 and which is connected to the return conduit 10.

Figure 4:
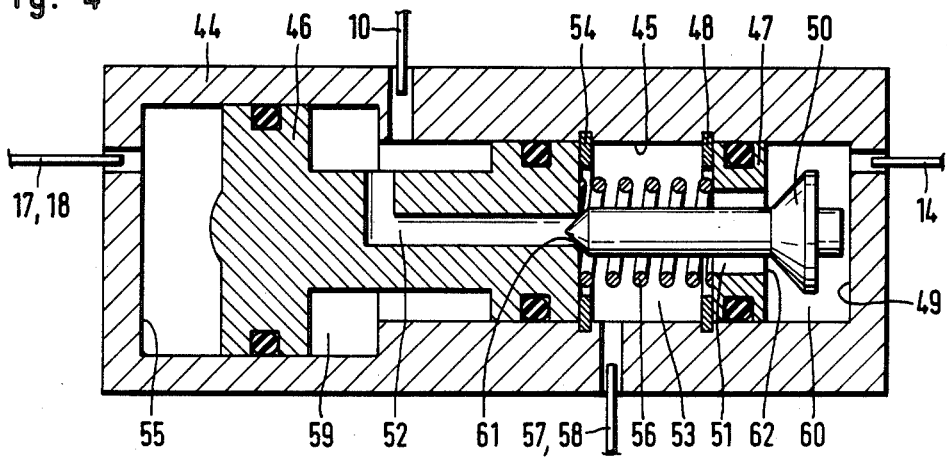

When the brake system functions properly, the piston 46 is displaced by the pressure in the fron wheel brake circuit 17 and/or 18, and the piston 47 by the pressure in the rear wheel brake circuit 14, the sealing seat 61 of the valve body 50 closing the pressure medium passage 52 to the annular chamber 59 and thus to the return conduit 10, as illustrated in FIG. 4.

Figure 3:
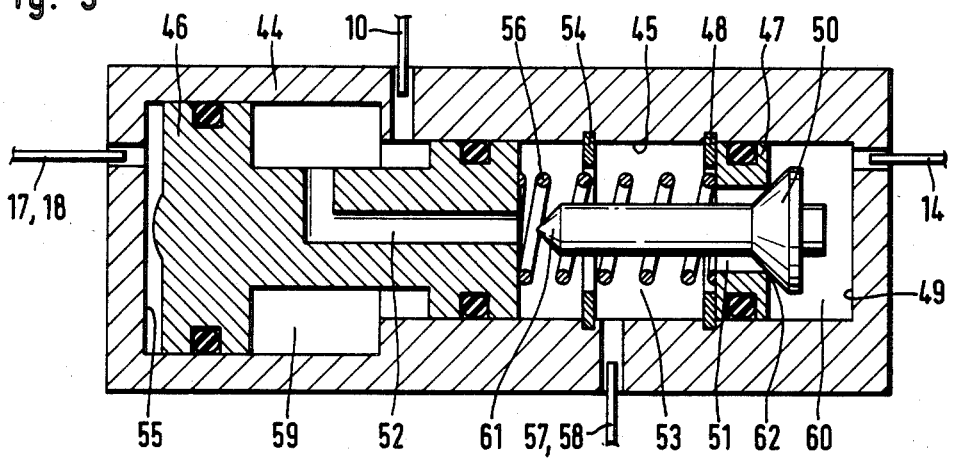

When the pressure in the front axlw brake circuit 17 and/or 18 is reduced to a value below the pressure prevailing in the diagonal rear axle brake circuit 14, the piston 46 moves away from the piston 47, the sealing seat 62 of the valve body 50 of the piston 47 closing the valve passage 51 so that the connected rear wheel brake HL and/or HR is cut-off. At the same time, the sealing seat 61 opens the valve passage 52 to the return conduit 10 so that the pressure in the wheel brake is reduced, as illustrated in FIG. 3

What is claimed is:

1. A slip controlled brake system for automotive vehicles of the type including an auxiliary hydraulic pressure medium source connected to a booster chamber of a master cylinder wherein said master cylinder includes a brake pedal operated pressure control valve interposed between said booster chamber and said auxiliary pressure medium source, electric valve means electrically connected to and controlled by an electronic controller of said system for controlling flow of said pressure medium from said booster chamber to a pre-chamber of said master cylinder, said prechamber hydraulically connected to a pair of working chambers in said master cylinder, said each of said working chambers connected to a static brake circuit leading to a respective one of two front brakes of said vehicle, said booster chamber hydraulically connected to a dynamic brake circuit leading to each of two rear brakes of said vehicle, comprising a normally open solenoid valve operated by said electronic controller in each statis brake circuit between each working chamber and each front brake and in the dynamic brake circuit between said booster chamber and each rear brake, a pair of hydraulic valves each having a first inlet connected to one of said static brake circuits between said solenoid valve and said front brake, a second inlet of each of said hydraulic valves connected to said dynamic brake circuit between said solenoid valve and said rear brake and each hydraulic valve having a first outlet connected to a reservoir of said brake systems, each said hydraulic valve including a second outlet connected to a rear brake of said vehicle diagonally opposite the front brake of said vehicle which is connected to connect to the first inlet of said respective hydraulic valve, each hydraulic valve including means responsive to pressure at said first inlet providing for hydraulic connection between said second inlet and said second outlet when said pressure is above a predetermined value, said means responsive to pressure at said first inlet further providing for simultaneous interruption of said connection between said second inlet and said second outlet and connection of said first outlet to said second outlet when said pressure is below said predetermined value.

2. The slip-controlled brake system as claimed in claim 1 wherein said means responsive to said pressure comprises two pistons in a stepped bore of said hydraulic valve one piston responsive to said pressure at said first inlet and including a hydraulic path extending from said first outlet to said second outlet, a second piston in said bore responsive to a pressure at said second inlet including a passage therein connecting said second inlet to said second outlet, and a valve body in said passage in said second piston including a first valve portion at said passage in said second piston, said first valve portion and said second piston being displaced apart with said pressure above said predetermined value, said valve body including a second valve portion in said hydraulic path in said first piston, said second valve portion being sealingly engaged to said first piston to close said hydraulic path when said pressure at said first inlet is above said predetermined value.

3. The slip-controlled brake system as claimed in claim 1 wherein one of said pair of hydraulic valves connected to one of said static brake circuits leading to one of said two front brakes operates to reduce the pressure in the dynamic brake circuit leading to one of said two rear brakes diagonally opposite said one of said front brakes in the event of a failure of said front brake static brake circuit resulting from a defect therein.

* * * * *